United States Patent
Acharya et al.

(10) Patent No.: US 10,210,650 B1
(45) Date of Patent: Feb. 19, 2019

(54) PRIMITIVE LEVEL PREEMPTION USING DISCRETE NON-REAL-TIME AND REAL TIME PIPELINES

(71) Applicant: ADVANCED MICRO DEVICES, INC., Santa Clara, CA (US)

(72) Inventors: Anirudh R. Acharya, San Diego, CA (US); Swapnil Sakharshete, San Diego, CA (US); Michael Mantor, Orlando, FL (US); Mangesh P. Nijasure, Orlando, FL (US); Todd Martin, Orlando, FL (US); Vineet Goel, San Diego, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/828,055

(22) Filed: Nov. 30, 2017

(51) Int. Cl.
| | | |
|---|---|---|
| *G06T 15/00* | (2011.01) | |
| *G06T 1/20* | (2006.01) | |
| *G06T 15/80* | (2011.01) | |
| *G06F 9/48* | (2006.01) | |
| *G06F 9/50* | (2006.01) | |

(52) U.S. Cl.
CPC .......... *G06T 15/005* (2013.01); *G06F 9/4831* (2013.01); *G06F 9/505* (2013.01); *G06T 1/20* (2013.01); *G06T 15/80* (2013.01)

(58) Field of Classification Search
None
See application file for complete search history.

(56) References Cited

U.S. PATENT DOCUMENTS

| | | | |
|---|---|---|---|
| 6,621,495 B1* | 9/2003 | Cook | G06T 15/005 345/418 |
| 6,636,224 B1* | 10/2003 | Blythe | G06T 15/005 345/502 |
| 2003/0164824 A1* | 9/2003 | Parsons | G06T 15/005 345/419 |
| 2005/0125802 A1* | 6/2005 | Wang | G06F 9/3009 718/108 |
| 2013/0339681 A1* | 12/2013 | Prado | G06F 9/30123 712/225 |
| 2016/0179714 A1* | 6/2016 | Acharya | G06F 12/023 711/158 |
| 2016/0260246 A1* | 9/2016 | Oldcorn | G06T 1/20 |

* cited by examiner

*Primary Examiner* — Joni Richer

(57) ABSTRACT

Processing of non-real-time and real-time workloads is performed using discrete pipelines. A first pipeline includes a first shader and one or more fixed function hardware blocks. A second pipeline includes a second shader that is configured to emulate the at least one fixed function hardware block. First and second memory elements store first state information for the first pipeline and second state information for the second pipeline, respectively. A non-real-time workload executing in the first pipeline is preempted at a primitive boundary in response to a real-time workload being dispatched for execution in the second pipeline. The first memory element retains the first state information in response to preemption of the non-real-time workload. The first pipeline is configured to resume processing the subsequent primitive on the basis of the first state information stored in the first memory element.

20 Claims, 5 Drawing Sheets

US 10,210,650 B1

PRIMITIVE LEVEL PREEMPTION USING DISCRETE NON-REAL-TIME AND REAL TIME PIPELINES

BACKGROUND

Processing units, such as graphics processing units (GPUs), typically implement multiple processing elements that concurrently execute instructions for one or more workloads. The processing elements in a GPU process three-dimensional (3-D) graphics using a graphics pipeline formed of a sequence of programmable shaders and fixed function hardware blocks. For example, a 3-D model of an object that is visible in a frame is represented by a set of primitives such as triangles, other polygons, or patches which are processed in the graphics pipeline to produce values of pixels for display to a user. The fixed function hardware blocks are used to fetch vertex information, construct the primitives, perform some discard or culling of the primitives, partition a screen, distribute workloads, perform amplification, and the like. States of the workloads executing in pipelines of the GPU are stored in locations such as vector general-purpose registers (VGPRs), local data shares (LDSs), and the like. A typical GPU is not dedicated to a single workload and, at any particular time, the GPU is typically executing a variety of workloads of various complexities and priorities.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Preemption of workloads that are executing in a pipeline of a conventional GPU allows other workloads to execute in the pipeline. However, preempting a workload that is executing in a pipeline of the conventional GPU to allow another workload to execute requires draining the currently executing workload (and corresponding state information) from the pipeline before beginning execution of the pre-empting workload. Furthermore, conventional preemption is performed at coarse boundaries (e.g., boundaries of a draw call) and therefore requires waiting for all the primitives associated with the draw call to complete and the on-chip states to be saved to an external (off-chip) memory for subsequent resumption of the workload before another workload is executed in the pipeline.

FIGS. 1-5 illustrate techniques for reducing preemption latency for real-time workloads by implementing separate and discrete non-real-time and real-time pipelines in a GPU. In some embodiments, the discrete pipelines include a first pipeline formed of a first shader and one or more fixed function hardware blocks and a second pipeline formed of a second shader that is configured to emulate the fixed function hardware blocks. Execution is able to switch between the first pipeline and the second pipeline at a primitive boundary. In some embodiments, the first and second pipelines are implemented in a command processor and a geometry engine. The first and second pipelines are associated with first and second state information, respectively, which are stored in first and second memory elements, respectively. Some embodiments of the first and second memory elements are implemented as different sets of registers for storing state information.

First and second queues (or ring buffers or pipelines) hold instruction blocks including draw calls or dispatches for non-real-time and real-time workloads, respectively. The first and second queues provide the instruction blocks to a scheduler for dispatching to the first and second pipelines. In response to the scheduler submitting a real-time workload, execution of a previously submitted non-real-time workload in the first pipeline is preempted at a primitive boundary to allow the real-time workload to execute in the second pipeline. This allows real-time workloads to be interleaved with non-real-time workloads at a primitive granularity. State information and data for the non-real-time workload is retained in the first memory element during preemption and so preemption of the non-real-time workload does not require draining all the primitives in a draw call that is being processed in the first pipeline. Preemption it is therefore supported at a primitive-level granularity with low latency. Resources that are common to the first and second pipelines are either reserved or partitioned (e.g., state programming) or emulated in a shader (e.g. fixed function primitive processing elements).

Figure 1:
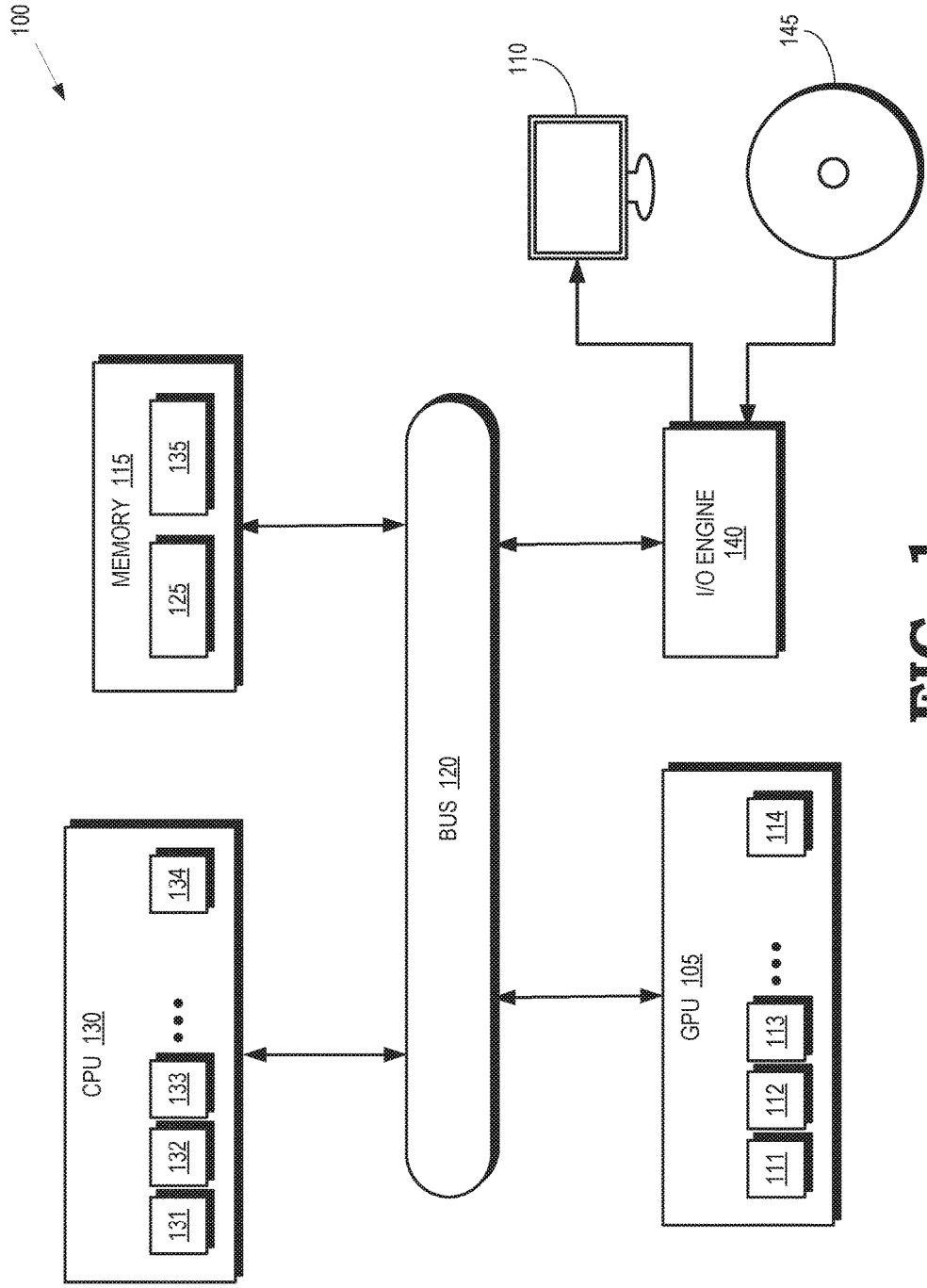
FIG. 1 is a block diagram of a processing system that includes a graphics processing unit (GPU) for generating visual images intended for output to a display according to some embodiments.

FIG. 1 is a block diagram of a processing system 100 that includes a graphics processing unit (GPU) 105 for generating visual images intended for output to a display 110 according to some embodiments. The GPU 105 is a multi-threaded processor that includes a plurality of processor cores 111, 112, 113, 114, which are collectively referred to herein as "the processor cores 111-114." The processor cores 111-114 are configured to execute instructions concurrently or in parallel. As discussed below, some embodiments of the processor cores 111-114 are used to implement pipelines in the GPU 105. Although four processor cores 111-114 are shown in FIG. 1 in the interest of clarity, some embodiments of the GPU 105 include tens or hundreds or more processor cores. Some embodiments of the processor cores 111-114 concurrently execute multiple instances (or waves) of a single program on multiple data sets, e.g. as single instruction, multiple data (SIMD) waves.

The processing system 100 includes a memory 115. Some embodiments of the memory 115 are implemented as a dynamic random access memory (DRAM). However, other embodiments of the memory 115 are implemented using other types of memory including static random access memory (SRAM), nonvolatile RAM, and the like. In the illustrated embodiment, the GPU 105 communicates with the memory 115 over a bus 120. However, some embodiments of the GPU 105 communicate with the memory 115 over a direct connection or via other buses, bridges, switches, routers, and the like. Some embodiments of the memory 115 are implemented as external, off-chip memory, e.g., the GPU 105 and the memory 115 are fabricated on different substrates. The GPU 105 executes instructions stored in the memory 115 and the GPU 105 stores information in the memory 115 such as the results of the executed instructions. For example, the memory 115 stores a copy 125 of instructions from a program code that is to be executed by the processor cores 111-114 in the GPU 105.

The processing system 100 includes a central processing unit (CPU) 130 for executing instructions. Some embodiments of the CPU 130 include multiple processor cores 131, 132, 133, 134 (collectively referred to herein as "the processor cores 131-134") that independently execute instructions concurrently or in parallel. Some embodiments of the CPU 130 are able to implement multiple pipelines using the processor cores 131-134. The CPU 130 is also connected to the bus 120 and therefore communicates with the GPU 105 and the memory 115 via the bus 120. The CPU 130 executes instructions such as program code 135 stored in the memory 115 and the CPU 130 stores information in the memory 115 such as the results of the executed instructions. The CPU 130 is also able to initiate graphics processing by issuing draw calls to the GPU 105. A draw call is a command that is generated by the CPU 130 and transmitted to the GPU 105 to instruct the GPU 105 render an object in a frame (or a portion of an object). In response to the draw call, the GPU 105 renders the object to produce values of pixels that are provided to the display 110, which uses the pixel values to display an image that represents the rendered object.

An input/output (I/O) engine 140 handles input or output operations associated with the display 110, as well as other elements of the processing system 100 such as keyboards, mice, printers, external disks, and the like. The I/O engine 140 is coupled to the bus 120 so that the I/O engine 140 is able to communicate with the GPU 105, the memory 115, or the CPU 130. In the illustrated embodiment, the I/O engine 140 is configured to read information stored on an external storage medium 145, such as a compact disk (CD), a digital versatile disc (DVD), a networked server, and the like. The external storage medium 145 stores information representative of program code used to implement an application such as a video game. The program code on the external storage medium 145 is written to the memory 115 to form the copy 125 of instructions that are to be executed by the GPU 105 or the program code 135 that is to be executed by the CPU 130.

The processor cores 111-114 in the multithreaded GPU 105 share resources that are used to support execution of workloads in the GPU 105. Some embodiments of the GPU 105 implement a set of vector general-purpose registers (VGPR, not shown in FIG. 1 in the interest of clarity) that store state information for the workloads that are executing on the processor cores 111-114. The VGPRs are shared between the workloads that are concurrently executing on the processor cores 111-114. For example, each workload is allocated a subset of the VGPRs to store state information for the workload. The workloads also share other resources of the GPU 105 including a local data share that is partitioned among the concurrently executing workloads, memory bandwidth that is shared by the workloads for accessing local caches, and the like. The processor cores 131-134 in the multithreaded CPU 130 also share resources.

The GPU 105 is configured to implement multiple pipelines for executing multiple workloads concurrently or in parallel. The workloads include non-real-time workloads that are not sensitive to delays or latency during processing in the pipelines of the GPU 105. The workloads also include real-time workloads that are sensitive to delays or latency during processing in the pipelines of the GPU 105. Examples of real-time workloads include timewarp operations that are used to warp or re-project a rendered virtual reality image to correct for head movement of the user that occurred after rendering the virtual reality image, workloads that generate heads up displays for gaming or transportation applications, window managers, and the like. Some embodiments of the processor cores 131-134 of the CPU 130 are also configured to implement multiple pipelines and operate in a manner that is similar to the GPU 105. Thus, in the interest of clarity, the following discussion is presented in the context of the GPU 105 with the understanding that the same techniques are applicable to the CPU 130.

The GPU 105 implements separate, discrete pipelines for processing the non-real-time workloads and the real-time workloads. In some embodiments, the discrete pipelines are only implemented as part of the front end of the GPU 105 and preemption is used to interleave the real-time and non-real-time workloads for provision to downstream portions of the GPU 105. Separate memory elements are used to store state information for the discrete pipelines, which enables the GPU 105 to perform low latency, primitive level switching between the non-real-time workloads and the real-time workloads. In some embodiments, the GPU 105 includes a first pipeline that is implemented using a first shader and one or more fixed function hardware blocks. The GPU 105 also includes a second pipeline that is implemented using a second shader that is configured to emulate one or more fixed function hardware blocks. In some embodiments, the second pipeline also includes other fixed function blocks that are not emulated. State information for the first and second pipelines is stored in corresponding memory elements such as separate sets of registers. The GPU 105 preempts non-real-time workloads that are in the first pipeline at a primitive boundary in response to a real-time workload being dispatched for execution in the second pipeline to service real-time workload as quickly as possible. The state information for the non-real-time workload is retained on-chip in response to preemption of the non-real-time workload. The first pipeline is configured to resume processing the subsequent primitive on the basis of the retained first state information.

Figure 2:
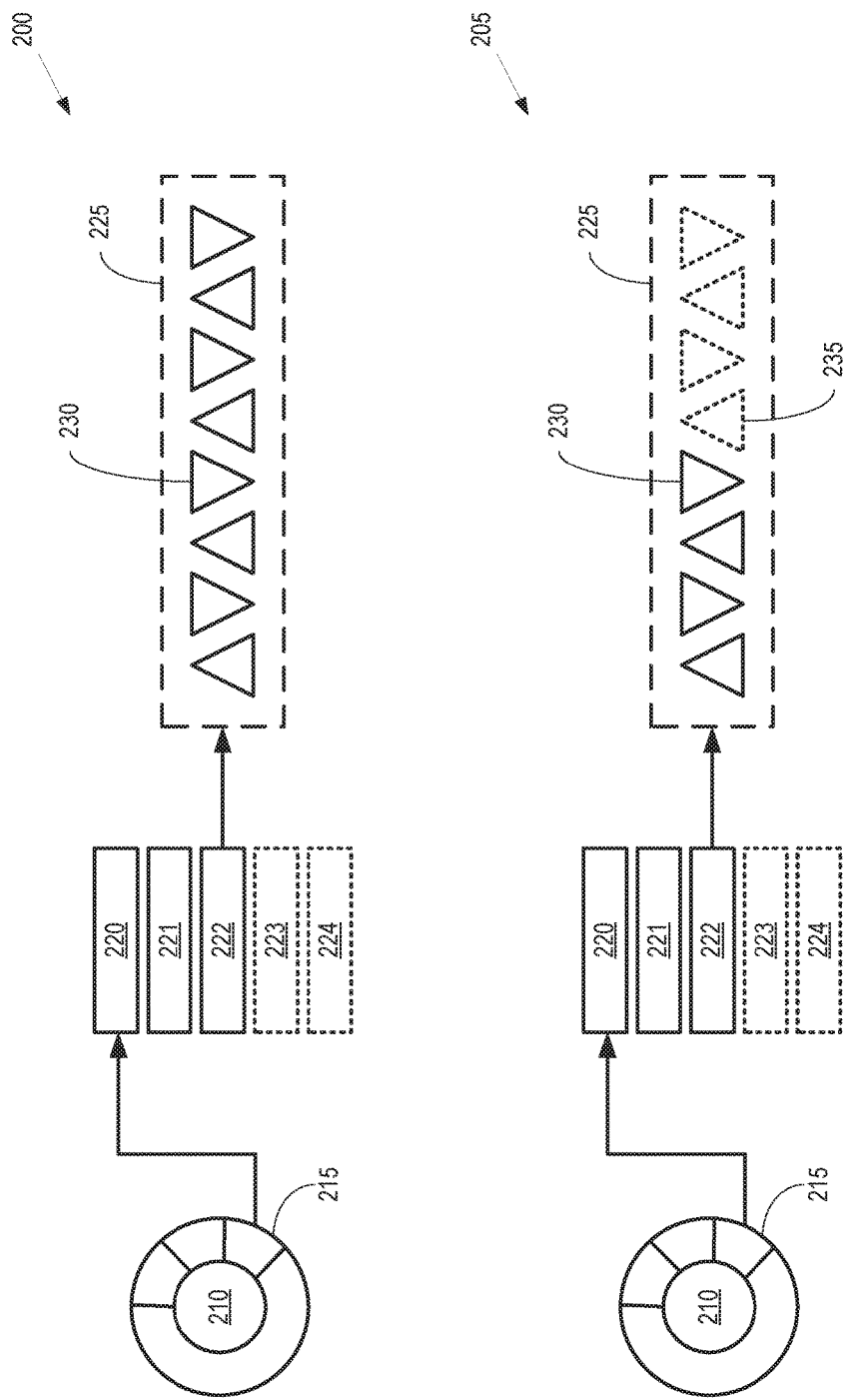
FIG. 2 is a block diagram that illustrates a first scenario that implements conventional preemption at draw call boundaries and a second scenario that implements preemption at primitive boundaries according to some embodiments.

FIG. 2 is a block diagram that illustrates a first scenario 200 that implements conventional preemption at draw call boundaries and a second scenario 205 that implements preemption at primitive boundaries according to some embodiments. A ring buffer 210 buffers one or more instruction blocks 215 (only one indicated by a reference numeral in the interest of clarity) such as draw calls or dispatches that are submitted to the GPU. In the illustrated embodiment, the instruction block 215 includes a set of draw calls 220, 221, 222, 223, 224 that are collectively referred to herein as "the draw calls 220-224." The instruction block 215 is submitted to first pipeline in a command processor in response to an external stimulus such as a user action. The draw calls 220-224 are each used to process a corresponding set of primitives in the first pipeline. For example, the draw call 222 is used to process a set of 225 of primitives 230, which are represented as triangles (only one indicated by a reference numeral in the interest of clarity). In the illustrated embodiment, the draw calls 220-224 represent non-real-time workloads.

As discussed herein, the non-real-time workloads represented by the draw calls 220-224 are preempted to allow processing of real-time workloads in a second, discrete pipeline. Conventional preemption is performed at boundaries of the draw calls 220-224. In the illustrated embodiment, conventional preemption is used to preempt the non-real-time workload represented by the draw calls 220-224 at the draw call boundary following the draw call 222. In order to respond to the presence of the real-time workload, the corresponding pipeline must allow all of the primitives 230 in the set 225 associated with the draw call 222 to complete processing before the non-real-time workload is preempted. In contrast, primitive level interleaving as disclosed herein allows the non-real-time workload to be preempted at primitive boundaries. In the illustrated embodiment, the non-real-time workload represented by the draw calls 220-224 is implemented prior to completing processing of all of the primitives 230 in the set 225 associated with the draw call 222. For example, the non-real-time workload is preempted at a primitive boundary following the primitive 230 and prior to processing of subsequent primitives 235 (as indicated by the dotted triangles).

State information for the preempted draw call 222 is stored on-chip, e.g., in one or more registers or other memory elements associated with the first pipeline, in response to preempting the draw call 222. The real-time workload is processed using the second pipeline while the draw call 222 is preempted at primitive boundary. Once the real-time workload has completed processing on the second pipeline, processing of the draw call 222 resumes on the first pipeline by initiating processing of the subsequent primitive 235 using the stored state information, thereby interleaving the real-time and non-real-time workloads at the primitive level.

Figure 3:
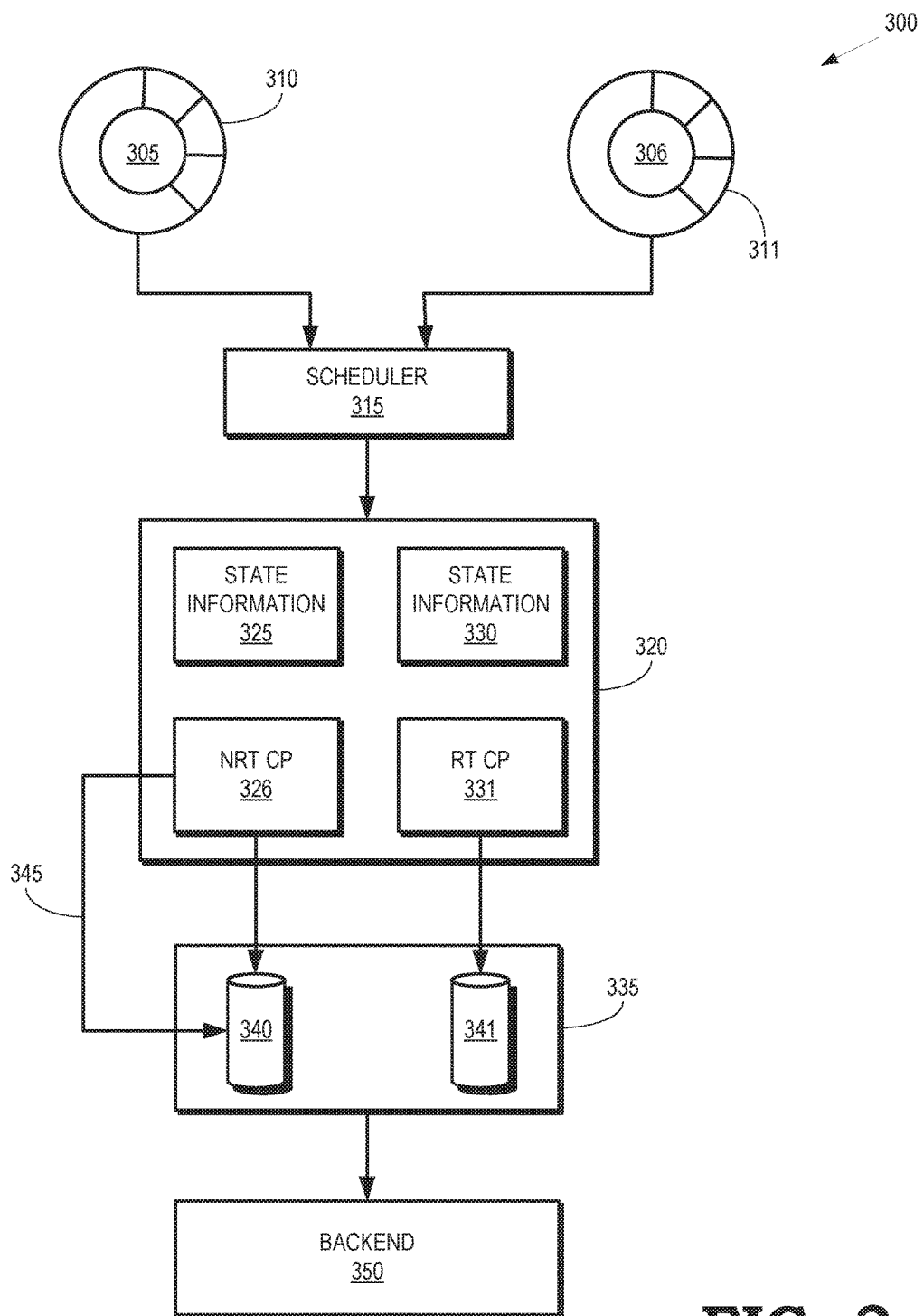
FIG. 3 is a block diagram of a GPU that implements discrete pipelines for processing non-real-time and real-time workloads according to some embodiments.

FIG. 3 is a block diagram of a GPU 300 that implements discrete pipelines for processing non-real-time and real-time workloads according to some embodiments. The GPU 300 is used to implement some embodiments of the GPU 105 shown in FIG. 1. The GPU 300 includes storage elements 305, 306 that are used to store instruction blocks 310, 311 that are used to generate draw calls for processing non-real-time and real-time workloads, respectively. The storage elements 305, 306 are implemented as ring buffers, queues, pipelines, or other structures that are able to store and sequentially provide the instruction block 310, 311 to other entities in the GPU 300. The GPU 300 also includes a scheduler 315 (implemented as software, firmware or hardware) that is configured to schedule the non-real-time and real-time workloads for submission to a command processor 320. The scheduler 315 schedules the real-time workloads at higher priority, e.g., the scheduler 315 schedules real-time workloads stored in the storage element 306 as soon as it shows up before scheduling any more non-real-time workloads stored in the storage element 305. As long as there are any real-time workloads pending in the storage element 306, the scheduler 315 bypasses scheduling of non-real-time workloads stored in the storage element 305.

The command processor 320 implements portions of a first pipeline for processing non-real-time workloads and a second pipeline for processing real-time workloads. The portion of the first pipeline includes a first memory element 325 that is used to store state information for the non-real-time workloads and a non-real-time command processor element (NRT CP) 326 that performs command processing for the non-real-time workloads that are dispatched to the command processor 320. The portion of the second pipeline includes a second memory element 330 that is used to store state information for the real-time workloads and a real-time command processor element (RT CP) 331 that performs command processing for the real-time workloads that are submitted to the command processor 320. Some embodiments of the memory elements 325, 330 are implemented using sets of registers associated with the corresponding pipelines.

The GPU 300 includes a geometry engine 335 that performs operations on primitives received from the command processor 320, such as fetching vertices of the primitives, assembling of the vertices, tessellation of the primitives, discarding or culling primitives, screen partitioning, workload distribution, geometric amplification, and the like. In the illustrated embodiment, the geometry engine 335 includes a portion 340 of the first pipeline that is implemented using one or more shaders that are configured using software and one or more fixed function hardware blocks that implement functionality encoded in their hardware. The portion 340 of the first pipeline is used to process non-real-time workloads. The geometry engine complex 335 also includes a portion 341 of the second pipeline that is implemented using shaders configured with software. The shaders in the portion 341 of the second pipeline are configured to emulate the fixed function hardware blocks implemented in the portion 340 of the first pipeline, thus obviating the need to evict the preempted non-real-time workload, state, or data.

Non-real-time workloads that are being processed by the first pipeline are preempted in response to the scheduler 315 submitting real-time workloads for processing by the second pipeline. This submission is asynchronous to the non-real-time workload and can therefore arrive anytime in the second pipeline. To preempt the non-real-time workloads, state information for the non-real-time workload is retained in the memory element 325 and primitives that are currently past the cut-off point 340 of the first pipeline are allowed to complete processing in the geometry engine 335. The non-real-time command processor 326 provides an interrupt signal 345 to instruct the portion 340 to stop processing subsequent primitives in the non-real-time workload. Preemption is performed on a primitive level by preempting at primitive boundaries and does not require waiting for all of the primitives in a draw call to complete processing before preemption is performed.

Once processing of the non-real-time workload in the first pipeline has been preempted, the second pipeline begins processing the real-time workload in the second pipeline. For example, the real-time command processor 331 begins providing draw calls or dispatches, and corresponding state information, to the portion 341 of the second pipeline. The real-time workload is thus being interleaved in the GPU pipeline at a primitive level granularity. Processing of the non-real-time workload in the first pipeline resumes in response to completion of processing of the real-time workload in the second pipeline. For example, the first pipeline resumes processing of primitives within a draw call on the basis of state/data information stored in the memory element 325. Switching between the non-real-time and real-time workloads is therefore performed with very low latency at a primitive level.

Primitives that have been processed by the geometry engine 335, and are therefore past the cutoff point 340, are provided to a backend module 350. The backend modules 350 process primitives on a primitive-by-primitive basis thus maintaining order. The primitives received by the backend modules 350 do not need to be grouped into draw calls. The relevant processing information is carried with the data. Thus, processing in the backend modules 350 is not affected by the primitive level preemption of non-real-time workloads.

Figure 4:
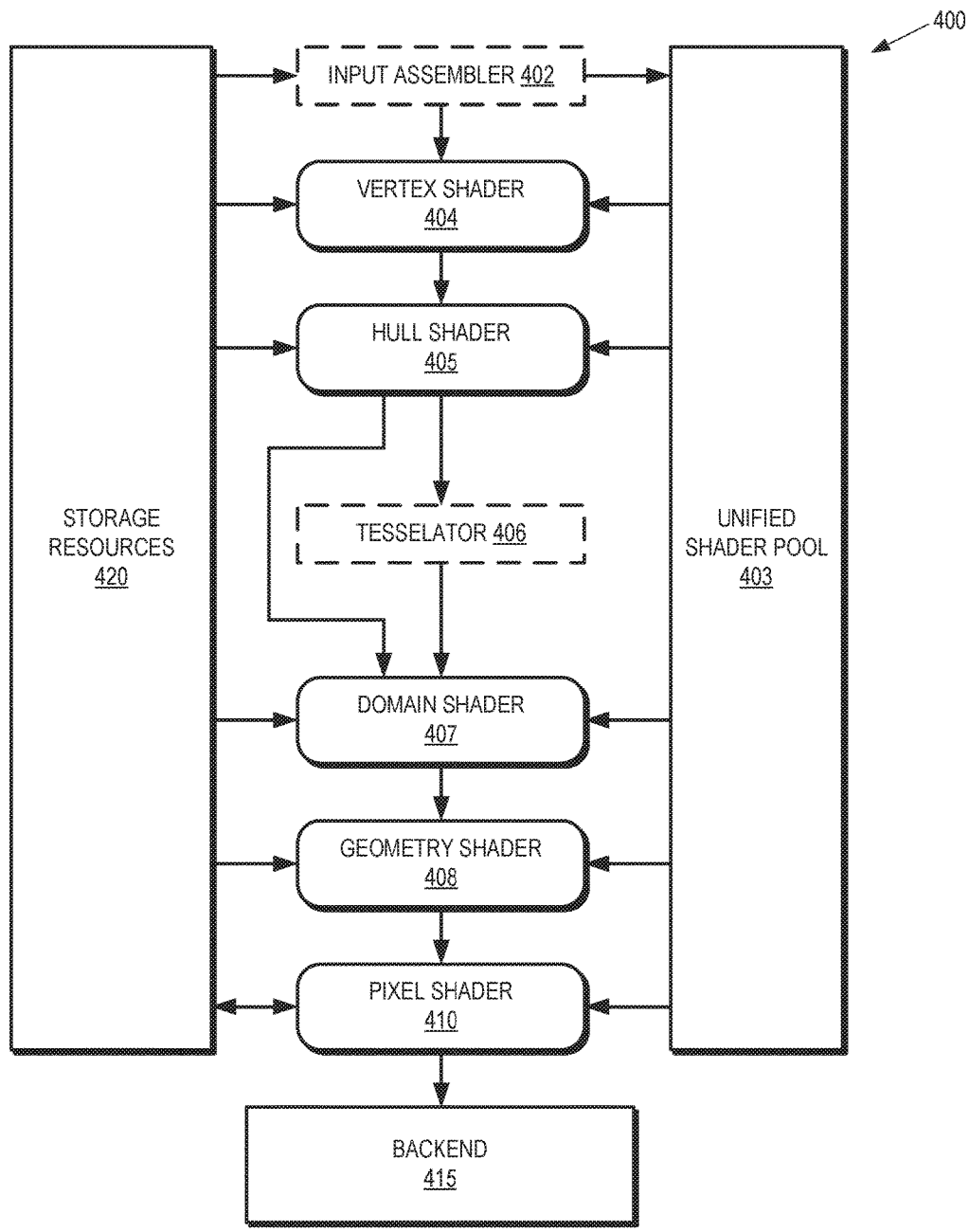
FIG. 4 depicts a graphics pipeline that is capable of processing high-order geometry primitives to generate rasterized images of three-dimensional (3-D) scenes according to some embodiments.

FIG. 4 depicts a graphics pipeline 400 that is capable of processing high-order geometry primitives to generate rasterized images of three-dimensional (3-D) scenes according to some embodiments. The graphics pipeline 400 is implemented in some embodiments of the GPU 105 shown in FIG. 1. For example, the processor cores 111-114 in the GPU 105 shown in FIG. 1 are used to implement some embodiments of the graphics pipeline 400. The graphics pipeline 400 is used to implement some embodiments of the first, non-real-time pipeline and the second, real-time pipeline shown in FIG. 3. The structure and implementation of the graphics pipeline 400 differs depending on whether the graphics pipeline 400 represents a non-real-time pipeline or a real-time pipeline, as discussed below. The real-time pipeline has feature parity with the non-real-time pipeline, irrespective of whether some pipeline stages are implemented as fixed function modules or as shaders.

The graphics pipeline 400 includes an input assembler 402 that is configured to access information from the storage resources 401 that is used to define objects that represent portions of a model of a scene. For example, the input assembler 402 fetches vertices of primitives from the storage resources 401. The implementation of the input assembler 402 depends on the type of pipeline, as indicated by the dashed box. If the graphics pipeline 400 is configured to implement a non-real-time pipeline, such as the portion 340 of the first pipeline shown in FIG. 3, the input assembler 402 is implemented as a fixed function hardware block. If the graphics pipeline 400 is configured to implement a real-time pipeline, such as the portion 341 of the second pipeline shown in FIG. 3, the input assembler 402 is emulated by a software-implemented shader using a common set of resources that is referred to herein as a unified shader pool 403. Some embodiments of the unified shader pool 403 are implemented using the processor cores 111-114 shown in FIG. 1.

A vertex shader 404, which is implemented in software, logically receives a single vertex of a primitive as input and outputs a single vertex. Some embodiments of shaders such as the vertex shader 404 implement single-instruction-multiple-data (SIMD) processing so that multiple vertices are processed concurrently, e.g., by the processor cores 111-114 shown in FIG. 1. The graphics pipeline 400 shown in FIG. 4 implements a unified shader model so that all the shaders included in the graphics pipeline 400 have the same execution platform on the shared SIMD processor cores. The shaders, including the vertex shader 404, are therefore implemented using the common set of resources provided by the unified shader pool 403.

A hull shader 405 operates on input high-order patches or control points that are used to define the input patches. The hull shader 405 is implemented in software using resources of the unified shader pool 403. The hull shader 405 outputs tessellation factors and other patch data.

Primitives generated by the hull shader 405, in some embodiments, are provided to a tessellator 406. The implementation of the tessellator 406 depends on the type of pipeline, as indicated by the dashed box. If the graphics pipeline 400 is configured to implement a non-real-time pipeline, the tessellator 406 is implemented as a fixed function hardware block. If the graphics pipeline 400 is configured to implement a real-time pipeline, the tessellator 406 may be emulated by a software-implemented shader using resources of the unified shader pool 403 or as fixed function hardware. The tessellator 406 receives objects (such as patches) from the hull shader 405 and generates information identifying primitives corresponding to the input object, e.g., by tessellating the input objects based on tessellation factors provided to the tessellator 406 by the hull shader 405. Tessellation subdivides input higher-order primitives such as patches into a set of lower-order output primitives that represent finer levels of detail, e.g., as indicated by tessellation factors that specify the granularity of the primitives produced by the tessellation process. A model of a scene can therefore be represented by a smaller number of higher-order primitives (to save memory or bandwidth) and additional details are added by tessellating the higher-order primitive.

A domain shader 407 inputs a domain location and (optionally) other patch data. The domain shader 407 is implemented in software using resources of the unified shader pool 403. The domain shader 407 operates on the provided information and generates a single vertex for output based on the input domain location and other information. A geometry shader 408 receives an input primitive and outputs up to four primitives that are generated by the geometry shader 408 based on the input primitive. The geometry shader 408 is implemented in software using resources of the unified shader pool 403.

A pixel shader 410 inputs a pixel flow and outputs zero or another pixel flow in response to the input pixel flow. The pixel shader 410 is implemented in software using resources of the unified shader pool 403. Primitives are provided from the pixel shader 410 to one or more backend modules 415, such as the backend modules 350 shown in FIG. 3.

The stages of the graphics pipeline 400 are able to access storage resources 420 that are shared by the waves being executed by the different stages using the processing resources in the unified shader pool 403. Portions of the storage resources 420 are implemented on-chip as part of the GPU 105 shown in FIG. 1 or off-chip using some embodiments of the memory 115 shown in FIG. 1. Although a single graphics pipeline 400 shown in FIG. 2, some embodiments of the storage resources 420 (as well as the unified shader pool 403) are shared by multiple graphics pipelines.

Figure 5:
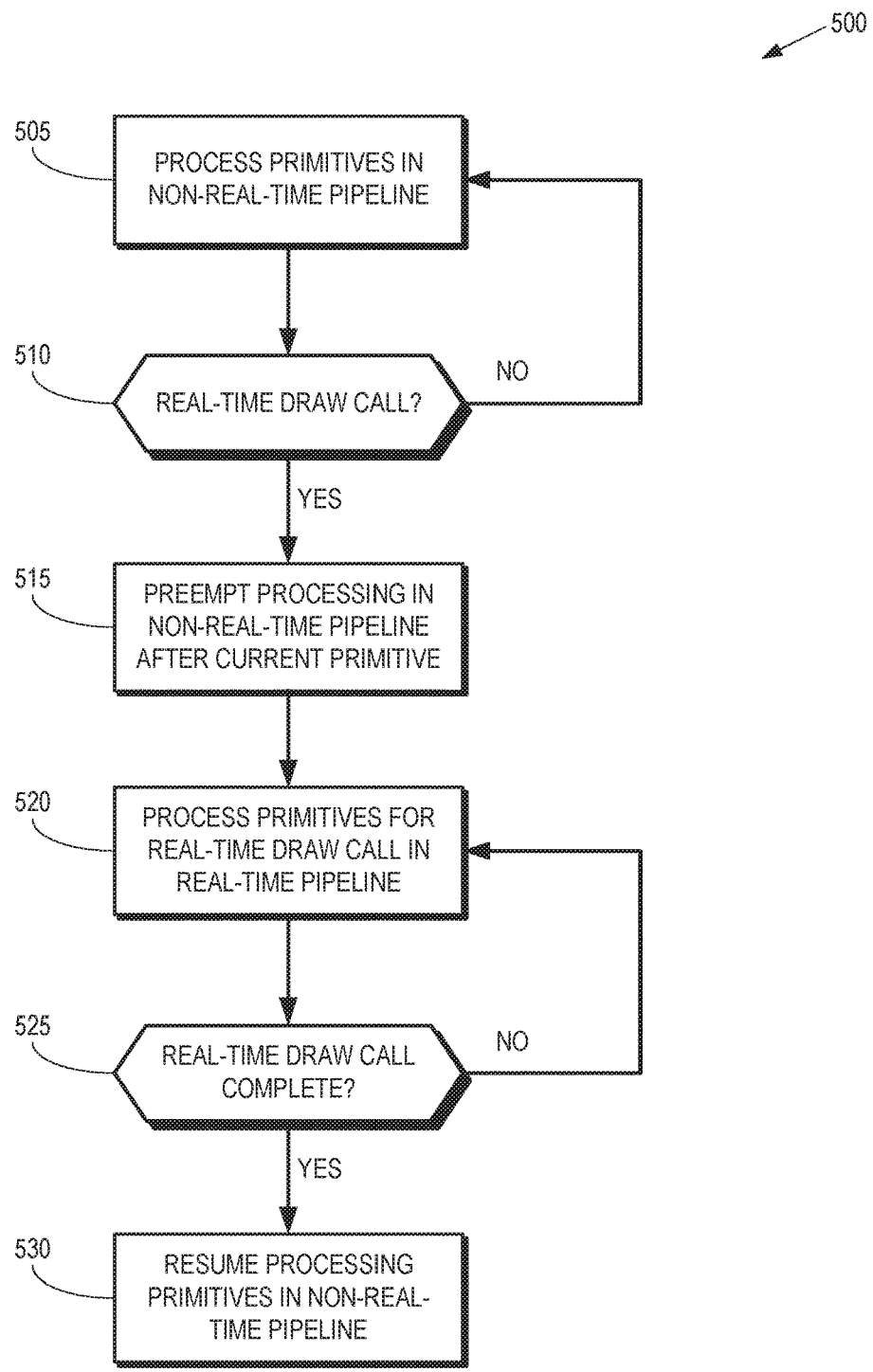
FIG. 5 is a flow diagram of a method of preempting a non-real-time workload at a primitive boundary to allow a real-time workload to execute on a separate pipeline according to some embodiments.

FIG. 5 is a flow diagram of a method 500 of preempting a non-real-time workload at a primitive boundary to allow a real-time workload to execute on a separate pipeline according to some embodiments. The method 500 is implemented in some embodiments of the processing system 100 shown in FIG. 1. In the illustrated embodiment, a GPU implements a non-real-time pipeline (such as first pipeline including the portion 340 shown in FIG. 3) and a real-time pipeline (such as the second pipeline including the portion 341 shown in FIG. 3). State information for the workloads executing on the non-real-time and the real-time pipeline are stored in separate sets of registers, such as the memory elements 325, 330 shown in FIG. 3.

At block 505, the non-real-time pipeline is processing primitives from a non-real-time workload such as a draw call. The GPU is also monitoring workloads to detect when a real-time workload is submitted for execution on the real-time pipeline.

At decision block 510, the GPU determines whether a real-time workload, such as a real-time draw call or dispatch, has been submitted for execution on the real-time pipeline. As long as no real-time workloads have been submitted, the GPU continues to process primitives in the non-real-time pipeline at block 505. In response to detecting submission of a real-time workload, the method 500 flows to block 515.

At block 515, processing of the non-real-time workload on the non-real-time pipeline is preempted at a primitive boundary. The primitive boundary is a boundary of a current primitive such as a triangle that is being processed in the non-real-time pipeline. Processing of the current primitive is allowed to complete before preempting the non-real-time workload if the current primitive is past a pre-determined cut off point in the geometry engine. In most cases, the primitive boundary falls within a coarse boundary of the non-real-time workload, e.g., the primitive boundary falls before a draw call boundary of a draw call. Thus, a subset of the primitives in the draw call do not complete processing in the non-real-time pipeline before the processing is preempted. State information for the non-real-time workload is therefore retained in the corresponding registers so that the state information is subsequently used to resume processing of the subset of the primitives in the draw call after the real-time workload has completed processing.

At block 520, primitives in the real-time workload, such as a real-time draw call or workgroups in a real-time compute dispatch, are processed in the real-time pipeline. Processing of the primitives in the real-time workload is performed on the basis of corresponding state information.

At decision block 525, the GPU determines whether processing of the primitives in the real-time draw call is complete. As long as some primitives in the real-time draw call require processing, the method 500 continues to process the primitives or subsequent draws from the real-time pipeline at block 520. In response to determining that processing of the primitives and all draws in the real-time pipeline is complete, the method 500 flows to block 530.

At block 530, the GPU resumes processing the primitives and draw calls or dispatches in the non-real-time pipeline on the basis of the state information stored in the corresponding registers. The GPU therefore performs low latency switching between real-time and non-real-time workloads.

In some embodiments, the apparatus and techniques described above are implemented in a system comprising one or more integrated circuit (IC) devices (also referred to as integrated circuit packages or microchips), such as the multipipeline processing systems described above with reference to FIGS. 1-5. Electronic design automation (EDA) and computer aided design (CAD) software tools are used in the design and fabrication of these IC devices. These design tools typically are represented as one or more software programs. The one or more software programs comprise code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus comprising:
 a first pipeline that comprises a first shader and at least one fixed function hardware block;

a second pipeline that comprises a second shader that is configured to emulate the at least one fixed function hardware block; and first and second memory elements to store first state information for the first pipeline and second state information for the second pipeline, respectively, and wherein a non-real-time workload executing in the first pipeline is preempted at a primitive boundary in response to a real-time workload being submitted for execution in the second pipeline.

2. The apparatus of claim 1, further comprising:
a command processor; and
a geometry engine, wherein the first pipeline and the second pipeline are implemented in the command processor and the geometry engine.

3. The apparatus of claim 2, wherein the first and second memory elements are implemented as first and second sets of registers in the command processor.

4. The apparatus of claim 2, wherein the non-real-time workload comprises a plurality of primitives, wherein the command processor is configured to provide an interrupt signal to the geometry engine in response to submission of the real-time workload, and wherein the first pipeline stops processing the plurality of primitives in response to the interrupt signal after completing processing of a current primitive in the plurality of primitives.

5. The apparatus of claim 2, further comprising:
a scheduler that is configured to dispatch the non-real-time workload and the real-time workload to the command processor.

6. The apparatus of claim 1, wherein the first pipeline is configured to resume processing a subsequent primitive from the non-real-time workload in response to the second pipeline completing execution of the real-time workload.

7. The apparatus of claim 6, wherein the first memory element retains the first state information in response to preemption of the non-real-time workload, and wherein the first pipeline is configured to resume processing the subsequent primitive based on the first state information stored in the first memory element.

8. The apparatus of claim 1, wherein the at least one fixed function hardware block is configured to perform at least one of a vertex fetch, discarding or culling of a primitive, screen partitioning, workload distribution, or geometric amplification.

9. The apparatus of claim 1, wherein the first and second memory elements are implemented as at least one of a queue, a ring buffer, or a pipeline.

10. A method comprising:
processing primitives in a non-real-time workload in a first pipeline that comprises a first shader and at least one fixed function hardware block;
preempting the processing of the primitives in the non-real-time workload at a primitive boundary in response to submission of a real-time workload; and
in response to preempting the processing of the primitives in the non-real-time workload, processing the real-time workload in a second pipeline that comprises a second shader that is configured to emulate the at least one fixed function hardware block.

11. The method of claim 10, wherein preempting the processing of the primitives in the non-real-time workload comprises preempting the processing in response to receiving an interrupt signal indicating that the non-real-time workload is being preempted.

12. The method of claim 11, wherein preempting the processing of the primitives in the non-real-time workload comprises stopping processing the primitives in the non-real-time workload in response to the interrupt signal after completing processing of a current primitive.

13. The method of claim 10, further comprising:
resuming processing a subsequent primitive from the non-real-time workload in the first pipeline in response to the second pipeline completing execution of the real-time workload.

14. The method of claim 13, further comprising:
retaining first state information in a first memory element in response to preemption of the non-real-time workload, and
wherein resuming processing of the subsequent primitive from the non-real-time workload in the first pipeline comprises resuming processing of the subsequent primitive based on the first state information stored in the first memory element.

15. A method comprising:
processing, in non-real-time, a first draw call or dispatch comprising a first plurality of primitives, wherein the first draw call or dispatch is processed in a first pipeline that comprises a first shader and at least one fixed function hardware block;
receiving a second draw call or dispatch comprising a second plurality of primitives for processing in real-time;
in response to receiving the second draw call or dispatch, preempting the processing of the first plurality of primitives at a primitive boundary prior to completing processing of the first plurality of primitives; and
in response to preempting the processing of the first plurality of primitives, processing the second plurality of primitives in real-time in a second pipeline that comprises a second shader that is configured to emulate the at least one fixed function hardware block.

16. The method of claim 15, wherein receiving the second draw call or dispatch comprises receiving the second draw call or dispatch at a command processor.

17. The method of claim 16, further comprising:
providing an interrupt signal from the command processor to a portion of the first pipeline implemented in a geometry engine, wherein the interrupt signal is provided in response to receiving the second draw call or dispatch.

18. The method of claim 17, wherein preempting the processing of the first plurality of primitives comprises completing processing of a current primitive in the portion of the first pipeline implemented in the geometry engine and stopping processing of the first plurality of primitives in response to completing processing of the current primitive.

19. The method of claim 15, further comprising:
resuming processing a subsequent primitive from the first plurality of primitives in the first pipeline in response to the second pipeline completing processing of the second plurality of primitives.

20. The method of claim 19, further comprising:
storing, in a first memory element implemented as part of the first pipeline, first state information for the first plurality of primitives in response to preemption of the first plurality of primitives, and
wherein resuming processing of the subsequent primitive comprises resuming processing of the subsequent primitive based on the first state information.

* * * * *